US009582835B2

(12) United States Patent
Yoon et al.

(10) Patent No.: US 9,582,835 B2
(45) Date of Patent: Feb. 28, 2017

(54) APPARATUS, SYSTEM, AND METHOD FOR SEARCHING FOR POWER USER IN SOCIAL MEDIA

(71) Applicant: Electronics and Telecommunications Research Institute, Daejeon (KR)

(72) Inventors: Yeo Chan Yoon, Seoul (KR); Hyun Ki Kim, Daejeon (KR); Hyeon Jin Kim, Daejeon (KR); Hyo Jung Oh, Daejeon (KR); Chung Hee Lee, Daejeon (KR); Myung Gil Jang, Daejeon (KR); Yo Han Jo, Seoul (KR); Mi Ran Choi, Daejeon (KR); Yoon Jae Choi, Chuncheon (KR); Jeong Heo, Daejeon (KR); Pum Mo Ryu, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 128 days.

(21) Appl. No.: 13/761,352

(22) Filed: Feb. 7, 2013

(65) Prior Publication Data

US 2014/0136527 A1    May 15, 2014

(30) Foreign Application Priority Data

Nov. 14, 2012   (KR) .......................... 10-2012-0128758

(51) Int. Cl.
G06F 17/30 (2006.01)
G06Q 50/00 (2012.01)
G06Q 10/10 (2012.01)

(52) U.S. Cl.
CPC ............. G06Q 50/01 (2013.01); G06Q 10/10 (2013.01)

(58) Field of Classification Search
CPC ......... G06F 17/30864; G06F 17/30867; G06F 17/30675; G06F 17/30696
(Continued)

(56) References Cited

U.S. PATENT DOCUMENTS 7,117,199 B2 * 10/2006 Frank et al.
7,590,709 B2 *  9/2009 Kikuchi ........................ 709/219
(Continued)

FOREIGN PATENT DOCUMENTS

KR       10-0492075         6/2005

OTHER PUBLICATIONS

Office Action mailed Jun. 20, 2016 in Korean Patent Application No. 10-2012-0128758.

Primary Examiner — Scott A Waldron
Assistant Examiner — Dongming Wang
(74) Attorney, Agent, or Firm — Staas & Halsey LLP (57) ABSTRACT

Disclosed are an apparatus, a system, and a method for searching for a power user in social media. The apparatus according to the present invention includes an input unit configured to receive a keyword corresponding to an interested object from a user; a communication unit configured to transmit a search request message including the received keyword and receive a search response message corresponding to the transmitted search request message; a controller configured to, when receiving the search response message, extract a search list in which power users related to the keyword are arranged according to a preset power ranking from the received search response message; a display unit configured to sequentially display the power users related to the keyword received from the user according to the preset power ranking based on the extracted search list; and a storage unit configured to store the extracted search list.

18 Claims, 10 Drawing Sheets

(58) Field of Classification Search
USPC .......................................................... 707/723
See application file for complete search history.

(56) References Cited

U.S. PATENT DOCUMENTS

| | | | | |
|---|---|---|---|---|
| 8,577,875 | B2* | 11/2013 | Ramsey | 707/723 |
| 8,688,673 | B2* | 4/2014 | Sarkar | G06F 17/30705 |
| | | | | 707/706 |
| 8,707,184 | B2* | 4/2014 | Chen et al. | 715/738 |
| 2005/0256889 | A1* | 11/2005 | McConnell | 707/100 |
| 2006/0147099 | A1* | 7/2006 | Marshall et al. | 382/128 |
| 2008/0059258 | A1* | 3/2008 | Lee | 705/7 |
| 2008/0154828 | A1* | 6/2008 | Antebi et al. | 706/46 |
| 2010/0010802 | A1* | 1/2010 | Ruano et al. | 704/9 |
| 2012/0117059 | A1* | 5/2012 | Bailey et al. | 707/723 |
| 2012/0185472 | A1* | 7/2012 | Ahmed | G06F 17/30867 |
| | | | | 707/728 |
| 2013/0097176 | A1* | 4/2013 | Khader et al. | 707/748 |
| 2013/0275429 | A1* | 10/2013 | York | G06F 17/30029 |
| | | | | 707/737 |
| 2014/0108422 | A1* | 4/2014 | Taylor et al. | 707/748 |

* cited by examiner

| | | | | | |
|---|---|---|---|---|---|
| XX ELECTRONICS | | | SEARCH | | |
| TWITTER RANKING | | | | | |
| 1 | KIM XX | ID1234 | | | |
| | DEFECT IS FOUND IN XX PRODUCT OF XX ELECTRONICS .... | | | RT:1294 | Mention:324 |
| 2 | XX ELECTRONICS | ID1234 | | | |
| | XX ELECTRONICS DEVELOPS AND PROMOTES A NEW PRODUCT. | | | RT:794 | Mention:524 |
| 3 | KIM XX | ID1234 | | | |
| | I LIKE XX ELECTRONICS VERY MUCH BECAUSE ~~ | | | RT:894 | Mention:52 |
| 4 | XX ELECTRONICS | ID1234 | | | |
| | XX ELECTRONICS HAS A LOT OF AS PROBLEMS! | | | RT:294 | Mention:624 |

FIG.8B

| | | | | | | |
|---|---|---|---|---|---|---|
| XX ELECTRONICS | | | SEARCH | | | |
| TWITTER RANKING | | | | | | |
| 1 | KIM XX | ID1234 | | | | |
| | DEFECT IS FOUND IN XX PRODUCT OF XX ELECTRONICS .... | | | GOOD:1294 | SHARING:324 | NUMBER OF REPLIES:324 |
| 2 | XX ELECTRONICS | ID1234 | | | | |
| | XX ELECTRONICS DEVELOPS AND PROMOTES A NEW PRODUCT. | | | GOOD:794 | SHARING:524 | NUMBER OF REPLIES:224 |
| 3 | KIM XX | ID1234 | | | | |
| | I LIKE XX ELECTRONICS VERY MUCH BECAUSE ~~ | | | GOOD:894 | SHARING:52 | NUMBER OF REPLIES:124 |
| 4 | XX ELECTRONICS | ID1234 | | | | |
| | XX ELECTRONICS HAS A LOT OF AS PROBLEMS! | | | GOOD:294 | SHARING:624 | NUMBER OF REPLIES:34 |

FIG.9A

| | | | | | |
|---|---|---|---|---|---|
| | XX ELECTRONICS | | | SEARCH | |

TWITTER RANKING

1  KIM XX | ID1234 | ANOTHER ARTICLE FOR XX ELECTRONIC WRITTEN BY USER | ANOTHER INTERESTED OBJECT OF USER
18630 following | 61485 followers | 4847 tweets | ARTICLES FOR XX ELECTRONICS: 201 ARTICLES 2  LEE XX | ID2234 | ANOTHER ARTICLE FOR XX ELECTRONIC WRITTEN BY USER | ANOTHER INTERESTED OBJECT OF USER
499 following | 38014 followers | 26183 tweets | ARTICLES FOR XX ELECTRONICS: 101 ARTICLES 3  PARK XX | ID1234 | ANOTHER ARTICLE FOR XX ELECTRONIC WRITTEN BY USER | ANOTHER INTERESTED OBJECT OF USER
9009 following | 96238 followers | 38599 tweets | ARTICLES FOR XX ELECTRONICS: 151 ARTICLES 4  SO-AND-SO | ID34 | ANOTHER ARTICLE FOR XX ELECTRONIC WRITTEN BY USER | ANOTHER INTERESTED OBJECT OF USER
17969 following | 1363837 followers | 7686 tweets | ARTICLES FOR XX ELECTRONICS: 51 ARTICLES 5  PROFILE NAME | IDA4 | ANOTHER ARTICLE FOR XX ELECTRONIC WRITTEN BY USER | ANOTHER INTERESTED OBJECT OF USER
18630 following | 61485 followers | 4847 tweets | ARTICLES FOR XX ELECTRONICS: 65 ARTICLES

FIG.9B

| | | XX ELECTRONICS | | | SEARCH |

FACEBOOK RANKING

| 1 | KIM XX | xx@mail.com | ANOTHER ARTICLE FOR XX ELECTRONIC WRITTEN BY USER | ANOTHER INTERESTED OBJECT OF USER |
| GOOD:420 NUMBER OF FRIENDS:193 POSTING:1205 | ARTICLES FOR XX ELECTRONICS: 201 ARTICLES |

| 2 | LEE XX | oo@mail.com | ANOTHER ARTICLE FOR XX ELECTRONIC WRITTEN BY USER | ANOTHER INTERESTED OBJECT OF USER |
| GOOD:520 NUMBER OF FRIENDS:123 POSTING:503 | ARTICLES FOR XX ELECTRONICS: 101 ARTICLES |

| 3 | PARK XX | aa@mail.com | ANOTHER ARTICLE FOR XX ELECTRONIC WRITTEN BY USER | ANOTHER INTERESTED OBJECT OF USER |
| GOOD:123 NUMBER OF FRIENDS:191 POSTING:125 | ARTICLES FOR XX ELECTRONICS: 151 ARTICLES |

| 4 | SO-AND-SO | ge@mail.com | ANOTHER ARTICLE FOR XX ELECTRONIC WRITTEN BY USER | ANOTHER INTERESTED OBJECT OF USER |
| GOOD:105 NUMBER OF FRIENDS:191 POSTING:157 | ARTICLES FOR XX ELECTRONICS: 51 ARTICLES |

| 5 | PROFILE NAME | xx@mail.com | ANOTHER ARTICLE FOR XX ELECTRONIC WRITTEN BY USER | ANOTHER INTERESTED OBJECT OF USER |
| GOOD:232 NUMBER OF FRIENDS:393 POSTING:525 | ARTICLES FOR XX ELECTRONICS: 65 ARTICLES |

FIG.10

# APPARATUS, SYSTEM, AND METHOD FOR SEARCHING FOR POWER USER IN SOCIAL MEDIA

CROSS-REFERENCE TO RELATED APPLICATIONS

This application claims priority to and the benefit of Korean Patent Application No. 10-2012-0128758 filed in the Korean Intellectual Property Office on Nov. 14, 2012, the entire contents of which are incorporated herein by reference.

TECHNICAL FIELD

The present invention relates to a social network system, and more particularly, to an apparatus, a system, and a method for searching for a power user in social media, which when receiving a keyword from a user, search for users or articles related to the received keyword, rank the found users or articles by using a preset evaluation parameter, and provide the ranked users or articles according to a ranking.

BACKGROUND ART

Various opinions and information are exchanged in social media, and more than 100 million users post billions of comments. A technology of detecting a power user from the users was conventionally developed and has been serviced.

However, the conventional technology simply ranks total users or recommends a user in a particular category, but does not rank power users related to each of the all keywords to provide them. When a social web is searched through a keyword, only a document including the corresponding keyword, a user matched with the corresponding keyword, or a particular domain (category) is searched.

When a user is recommended, it is not shown which article is posted in a corresponding field by the recommended user and which article is influential in connection with an input keyword.

SUMMARY OF THE INVENTION

The present invention has been made in an effort to solve the problems in the prior art and provide an apparatus, a system, and a method for searching for a power user in social media, which when receiving a keyword from a user, search for users or articles related to the received keyword, rank the found users or articles by using a preset evaluation parameter, and provide the ranked users or articles according to a ranking.

However, an object of the present invention is not limited to the aforementioned matter, and other objects which have not been mentioned may be clearly understood by those skilled in the art through the following description.

An exemplary embodiment of the present invention provides an apparatus for searching for a power user in social media, the apparatus including: an input unit configured to receive a keyword from a user; a communication unit configured to transmit a search request message including the received keyword and receive a search response message corresponding to the transmitted search request message; a controller configured to, when receiving the search response message, extract a search list in which power users related to the keyword are arranged according to a preset power ranking from the received search response message; a display unit configured to sequentially display the power users related to the keyword received from the user according to the preset power ranking based on the extracted search list; and a storage unit configured to store the extracted search list.

The communication unit may transmit the search request message to a portal service server and receive the search response message in response to the search request message from the portal service server.

The communication unit may transmit the search request message to a social media server and receive the search response message in response to the search request message from the social media server.

When receiving the search response message, the controller may extract a search list in which power articles related to the keyword are arranged according to a preset power ranking from the received search response message, and control such that the power articles related to the keyword received from the user are sequentially displayed in the display unit according to the preset power ranking based on the extracted search list.

The display unit may sequentially display the power users related to the keyword according to the preset power ranking and display a corresponding power ranking, identification information on the user, an article written by the user, and one or more evaluation parameter values used for evaluating the power ranking.

When a user in a particular ranking or an article written by the user within a power user ranking related to the keyword is selected, the display unit may display one or more articles related to the keyword written by the corresponding user.

When another interested object of a user in a particular ranking within a power user ranking related to the keyword is selected, the display unit may display one or more other interested objects in which the corresponding user is interested.

Another exemplary embodiment of the present invention provides a system for searching for a power user in social media, the system including: a communication unit configured to receive a keyword from a user terminal; a relevance analysis engine configured to search for social media having high relevance with the keyword; and a power analysis engine configured to analyze power of a user on a social network based on a search result to rank power users according to a result of the analysis, generate a search list including the ranked power users, and transmit the generated search list to the user terminal.

The power analysis engine may analyze power of articles on the social network based on the search result to rank power articles according to a result of the analysis, generate a search list including the ranked power articles, and transmit the generated search list to the user terminal.

The relevance analysis engine may include a word weight engine configured to determine one or more infrequent words from the keywords; and a query word automatic extension engine configured to suggest one or more words related to the keyword.

Yet another exemplary embodiment of the present invention provides a method of searching for a power user in social media, the method including: receiving a keyword from a user; transmitting a search request message including the received keyword and receiving a search response message corresponding to the transmitted search request message; extracting a search list in which power users related to the keyword are arranged according to a preset power ranking from the received search response message when the search response message is received; sequentially displaying the power users related to the keyword received from the user according to the preset power ranking based on the extracted search list; and storing the extracted search list.

The receiving of the keyword may include transmitting the search request message to a portal service server and receiving the search response message in response to the search request message from the portal service server.

The receiving of the keyword may include transmitting the search request message to a social media server and receiving the search response message in response to the search request message from the social media server.

The extracting of the search list may include extracting a search list in which power articles related to the keyword are arranged according to a preset power ranking from the received search response message when the search response message is received, and controlling such that the power articles related to the keyword received from the user are sequentially displayed according to the preset power ranking based on the extracted search list.

The sequentially displaying of the power users may include sequentially displaying the power users related to the keyword according to the preset power ranking in which a corresponding power ranking, identification information on the user, an article written by the user, and one or more evaluation parameter values used for evaluating the power ranking are displayed.

The sequentially displaying of the power users may include displaying one or more articles related to the keyword written by the corresponding user when a user in a particular ranking or an article written by the user within a power user ranking related to the keyword is selected.

The sequentially displaying of the power users may include displaying one or more other interested objects in which the corresponding user is interested when another interested object of a user in a particular ranking within a power user ranking related to the keyword is selected.

Accordingly, the present invention has an effect of continuously acquiring high quality information by, when receiving a keyword from a user, searching for users or articles related to the received keyword, ranking the found users or articles by using a preset evaluation parameter, and providing the ranked users or articles according to a ranking.

The present invention has an effect in that a company may handle positive articles or negative articles quickly by searching for a power user and continuously monitoring the articles of the found power user.

The present invention has an effect in that the company may use the articles of the power user related to a particular keyword as a means for marketing a product.

The foregoing summary is illustrative only and is not intended to be in any way limiting. In addition to the illustrative aspects, embodiments, and features described above, further aspects, embodiments, and features will become apparent by reference to the drawings and the following detailed description.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings.

Hereinafter, an apparatus, a system, and a method for searching for a power user in social media according to exemplary embodiments of the present invention will be described with reference to FIGS. 1 to 10. Parts required for understanding the operations and actions according to the present invention will be mainly described.

In descriptions of components of the present invention, different reference numerals may be designated to components having the same name according to the drawings, and the same reference numerals may be designated to components in different drawings. However, the cases do not mean that the corresponding component has different functions according to exemplary embodiments or has the same function in different exemplary embodiments, and the function of each component should be determined based on the description of each component in a corresponding exemplary embodiment.

Particularly, the present invention proposes a new method of when receiving a keyword from a user to provide a power user or article for each keyword, searching for users or articles related to the received keyword, ranking the found users or articles by using a preset evaluation parameter, and providing the ranked users or articles according to a ranking.

Figure 1:
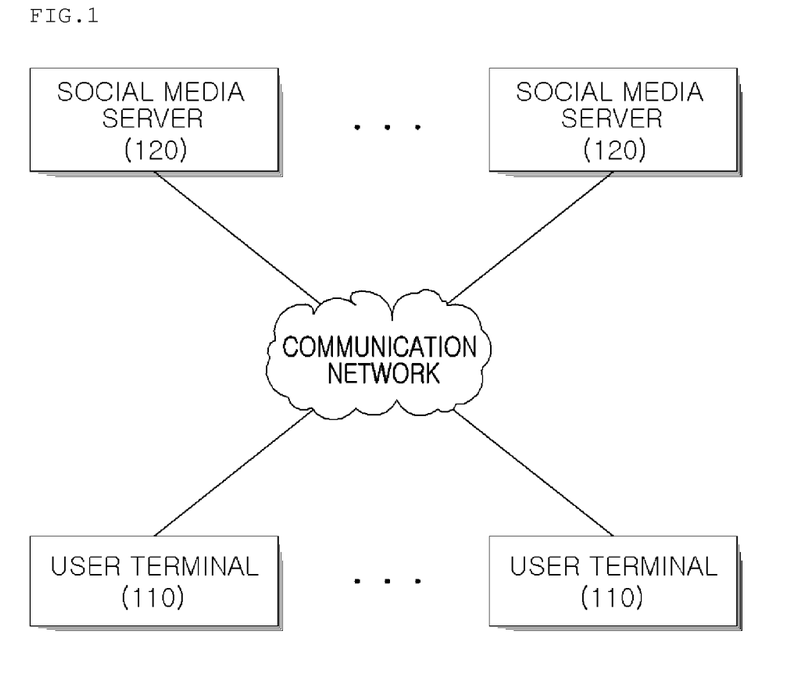
FIG. 1 schematically illustrates a configuration of a social network system according to an exemplary embodiment of the invention.

FIG. 1 schematically illustrates a configuration of a social network system according to an exemplary embodiment of the present invention.

As illustrated in FIG. 1, the social network system according to an exemplary embodiment of the present invention may include a user terminal 110 and a social media server 120.

The user terminal 110 may access the social media server 120 through wired or wireless communication to receive a keyword for an object, in which a user is interested, from the user, make a request for searching for a power user or article for the received keyword, and receive a search list including the power users or articles for the corresponding keyword.

At this time, the search list may be configured in such a manner that power users or articles for the received keyword are arranged in a high powered order with respect to the corresponding keyword.

The keyword may be largely divided into three types including, for example, 1) a name of a person, a company name, a product name, a policy name, a brand name, an entity name indicating a particular event or the like, 2) a particular issue or topic, and 3) a category.

For example, 1) the entity name may be "Yeosu Expo", "Apple", "four-river policy", "King Sejong the great", Iphone 4" and the like, 2) the particular issue or topic may be "missile fire of North Korea", "European economic crisis", "fare boost of subway line no. 9" and the like, and 3) the category may be "cooking", "politics", "sports", "entertainment", "broadcasting" and the like.

The user terminal 110 refers to an electronic device capable of performing wired or wireless communication, and may be a concept including, for example, a mobile phone, a smart phone, a PDA, a tablet PC, a notebook, a PC and the like.

The social media server 120 may receive a keyword from the user terminal 110, search for users or articles related to the received keyword, rank the found users or articles based on one or more preset evaluation parameters, and provide a search list including the ranked users or articles to the user terminal 110.

At this time, the social media server 120 refers to a server for providing social media such as Twitter, Facebook, and a blog, and may be physically separated for each of the social media.

The social media server 120 uses the one or more preset evaluation parameters in order to rank power users, which will be described with an example.

(A) In Twitter, evaluation parameters described in [Table 1] below may be used.

TABLE 1

| 1 | The number of articles related to a keyword among articles written by a Twitter user |
|---|---|
| 2 | The number of retweets of a corresponding article related to a keyword among articles written by a Twitter user |
| 3 | The number of followers of a Twitter user to be ranked |
| 4 | The number of power users related to a keyword among followers |
| 5 | The number of replies of a corresponding article related to a keyword among articles written by a Twitter user or a degree of association with the keyword of the replies |
| 6 | The user power ranking analyzed, independently from a keyword, using a follower, a followee, the number of tweets, the number of replies, the following network analysis and the like |

(B) In Facebook, evaluation parameters described in [Table 2] below may be used.

| 1 | The number of power users related to a keyword among friends of a Facebook user |
|---|---|
| 2 | The number of articles related to a keyword among articles written by a Facebook user |
| 3 | The number of "good" with respect to an article related to a keyword among articles written by a Facebook user |
| 4 | The number of sharing of a corresponding article related to a keyword among articles written by a Facebook user |
| 5 | The number of replies of a corresponding article related to a keyword among articles written by a Facebook user |
| 6 | The number of replies written by a power user with respect to a keyword among replies of a corresponding article related to the keyword among articles written by a Facebook user |
| 7 | The user power ranking analyzed, independently from a keyword, using the number of friends, the number of written articles, the number of received "good", the number of received replies", a friend network analysis and the like |

The social media server 120 uses one or more preset evaluation parameters in order to rank power articles, which will be described with an example.

(A) In Twitter, evaluation parameters described in [Table 3] below may be used.

| 1 | Relevance with a keyword |
|---|---|
| 2 | The number of replies |
| 3 | A degree of association with a keyword of replies |
| 4 | The number of retweets |
| 5 | The number of power users among retweet users |
| 6 | A retweet user power ranking |
| 7 | A power ranking of a user who writes the article |

(B) In Facebook, evaluation parameters described in [Table 4] may be used.

| 1 | Relevance with a keyword |
|---|---|
| 2 | The number of replies |
| 3 | A degree of association with a keyword of replies |
| 4 | The number of sharing |
| 5 | The number of power users among shared users |
| 6 | A shared user power ranking |
| 7 | The number of "good" |
| 8 | The number of power users among users pressing "good" |
| 9 | A power ranking of a user pressing "good" |
| 10 | A power ranking of a user who writes the article |

The present invention may apply one or more preset evaluation parameters for each of the social media, but the present invention is not limited thereto and may apply various parameters.

Figure 2:
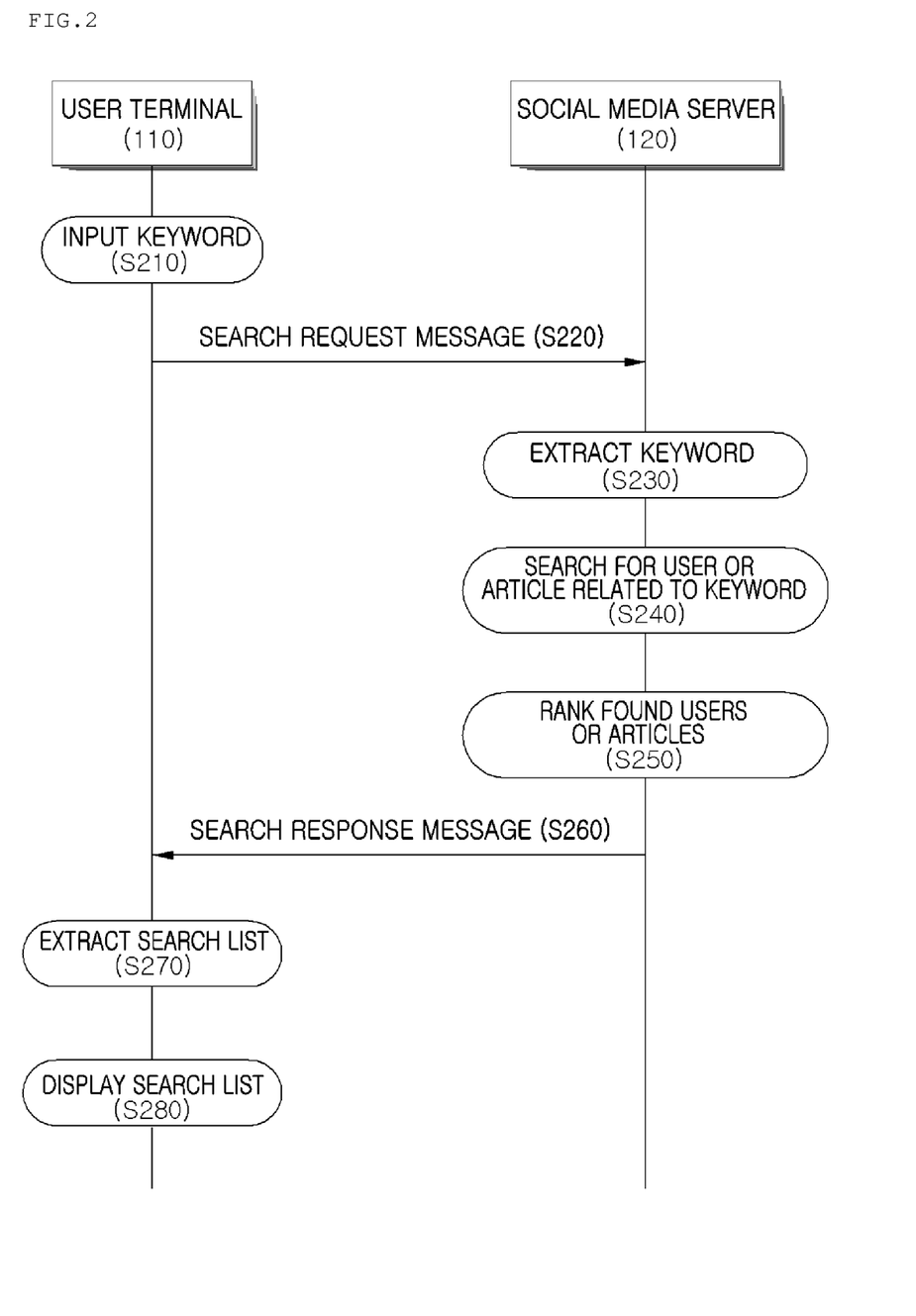
FIG. 2 illustrates a process of searching for a power user according to an exemplary embodiment of the present invention.

FIG. 2 illustrates a process of searching for a power user according to an exemplary embodiment of the present invention.

As illustrated in FIG. 2, when the user terminal 110 accesses the social media server 120 to receive a keyword from a user (step S210), the user terminal 110 may generate a search request message including the received keyword and transmit the generated search request message to the social media server 120 (step S220).

Next, when the social media server 120 receives the search request message, the social media server 120 may extract the keyword included in the received search request message (step S230) and search for users or articles related to the extracted keyword (step S240).

Next, the social media server 120 may rank the found users or articles based on the one or more preset evaluation parameters (step S250), generate a search response message including a search list of the ranked users or articles, and provide the generated search response message to the user terminal 110 (step S260).

Next, when the user terminal 110 receives the search response message, the user terminal 110 may extract a search list of power users or articles included in the received search response message (step S270) and display the power users or articles within the extracted search list according to a ranking (step S280).

Figure 3:
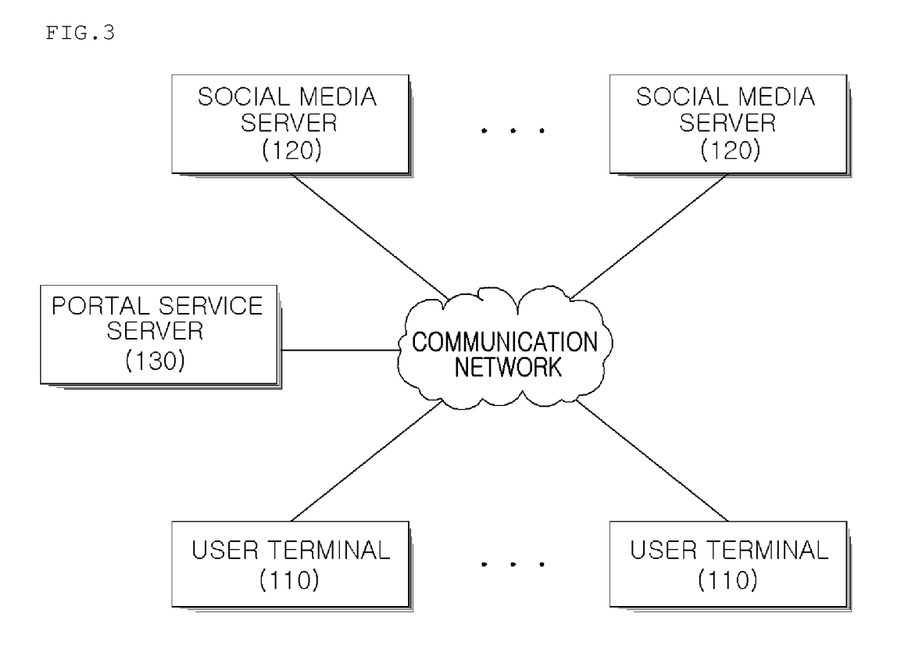
FIG. 3 schematically illustrates a configuration of a social network system according to another exemplary embodiment of the present invention.

FIG. 3 schematically illustrates a configuration of a social network system according to another exemplary embodiment of the present invention.

As illustrated in FIG. 3, the social network system according to another exemplary embodiment of the present invention may include the user terminal 110, the social media server 120, and a portal service server 130.

The user terminal 110 may access the portal service server 130 through wired or wireless communication to receive a keyword for an object, in which the user is interested in, from the user, make a request for searching for power users or articles for the received keyword, and receive a search list including the power users or articles for the corresponding keyword.

The social media server 120 may provide social media such as Twitter, Facebook, and a blog.

The portal service server 130 may receive a keyword from the user terminal 110, search for a user or an article related to the received keyword, rank the found users or articles based on at least one preset evaluation parameter, and provide a search list including the ranked users or articles to the user terminal 110.

In this case, the portal service server 130 may interwork with the social media server 120 through wired or wireless communication to search for users or articles related to the keyword.

Figure 4:
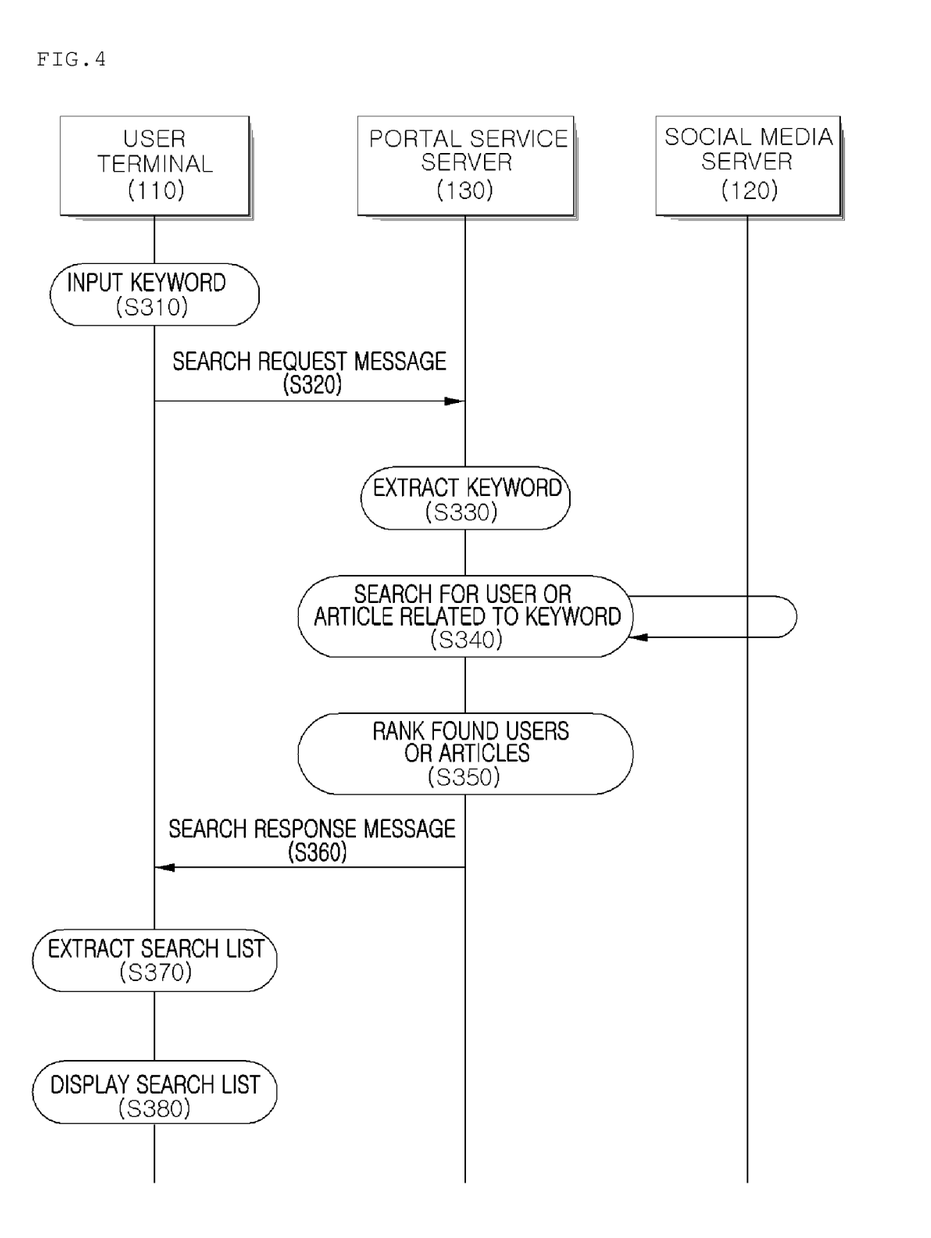
FIG. 4 illustrates a process of searching for a power user according to another exemplary embodiment of the present invention.

FIG. 4 illustrates a process of searching for a power user according to another exemplary embodiment of the present invention.

As illustrated in FIG. 4, when the user terminal 110 accesses the portal service server 130 to receive a keyword for an object, in which the user is interested in, from the user (step S310), the user terminal 110 may generate a search request message including the received keyword and transmit the generated search request message to the portal service server 130 through wired or wireless communication (step S320).

Next, when the portal service server 130 receive the search request message, the portal service server 130 may extract the keyword included in the received search request message (step S330) and search for users or articles related to the extracted keyword from the social media server 120 (step S340).

Next, the portal service server 130 may rank the found users or articles based on one or more preset evaluation parameters (step S350), generate a search response message including a search list of the ranked users or articles, and provide the generated search response message to the user terminal 110 (step S360).

Next, when the user terminal 110 receives the search response message, the user terminal 110 may extract a search list of power users or articles included in the received search response message (step S370) and display the power users or articles within the extracted search list according to a ranking (step S380).

Figure 5:
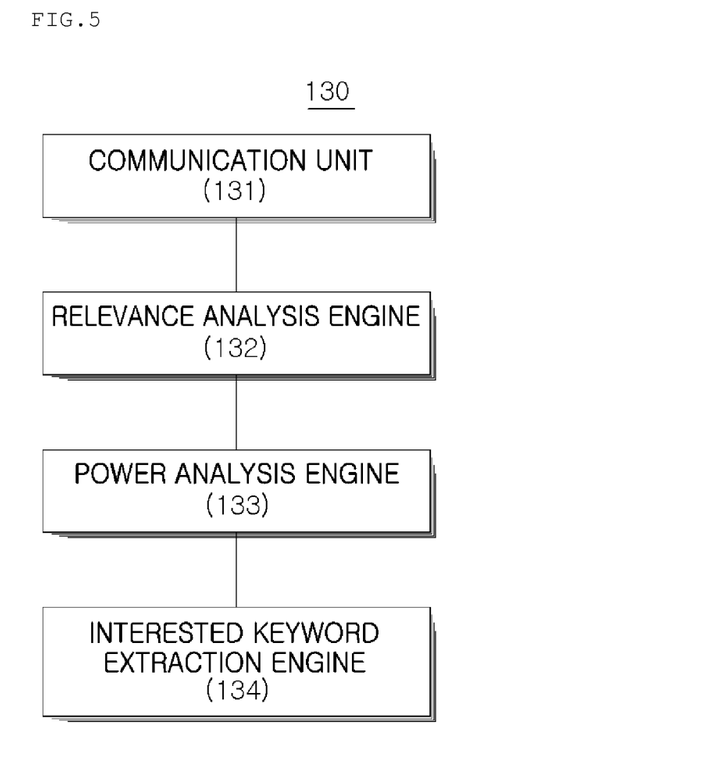
FIG. 5 illustrates a detailed configuration of a portal service server according to an exemplary embodiment of the present invention.

FIG. 5 illustrates a detailed configuration of the portal service server according to an exemplary embodiment of the present invention.

As illustrated in FIG. 5, the portal service server 130 according to an exemplary embodiment of the present invention may include a communication unit 131, a relevance analysis engine 132, a power analysis engine 133, and an interested keyword extraction engine 134.

The communication unit 131 may interwork with the user terminal 110 or the social media server 120 through wired or wireless communication to transmit/receive various data.

The relevance analysis engine 132 may search for social media having high relevance or association with a keyword. Here, the relevance analysis engine 132 may use various methods to analyze relevance, and may analyze relevance by using, for example, cosine similarity, a vector space model and the like.

At this time, the relevance analysis engine 132 may directly use the received keyword, but may determine important words according to a type of keywords to use the received keyword or may use associated words.

The relevance analysis engine 132 may further include a word weight engine for determining important words and a query word automatic extension engine for suggesting associated words.

For example, when the keyword is a particular issue or topic, the word weight engine determines a plurality of words related to the keyword, and determines an important word as a frequent word of the plurality of words with reference to frequencies in the social media.

When the keyword is a category, the query word automatic extension engine suggests words associated with the received keyword, and recommends "Korean food", "Western food", "seasoning" and the like as associated words of a word "cooking".

The power analysis engine 133 may analyze power of the user or power of the article on a social network based on a result analyzed by the relevance analysis engine 132. The power analysis engine 133 may rank power users or articles according to the analyzed result to generate a search list including the ranked power users or articles and transmit the generated search list to the user terminal through the communication unit 131.

The power analysis engine 133 may be divided into a power user analysis engine for analyzing power users and a power article analysis engine for analyzing power articles.

For example, the power user analysis engine may analyze power users with respect to the corresponding keyword on the social network and rank the power users and additional information on the corresponding users according to the analyzed result. Here, the additional information on the user may include information belonging to the social media such as a user ID and network information of the user, information on a power article for the keyword among articles written by the user, and an interested keyword in which the user is interested.

The power article analysis engine may analyze power articles for the corresponding keyword on the social network and rank the power articles and additional information on the corresponding articles according to the analyzed result. Here, the additional information on the articles may include information on a person who writes the article, another power article written by the person who writes the article, and additional information on the article.

The interested keyword extraction engine 134 may analyze a user profile and written article as well as the keyword received from the user to extract the interested keyword according to the analyzed result.

Figure 6:
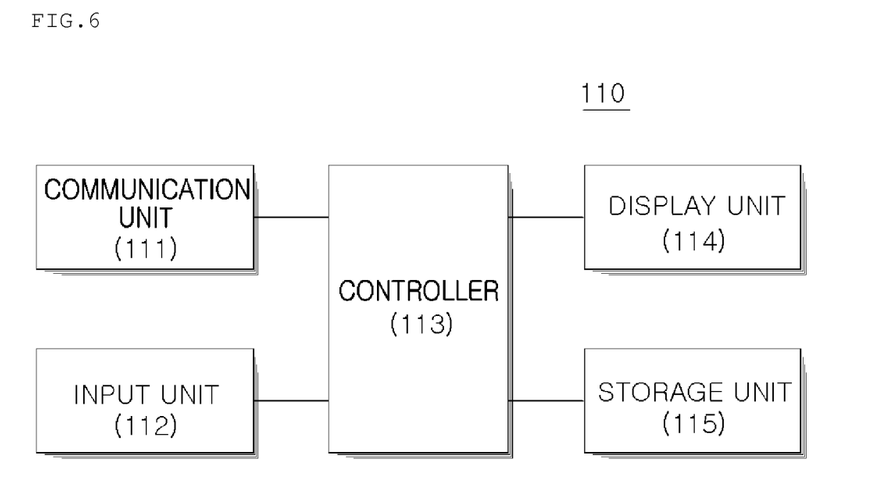
FIG. 6 illustrates a detailed configuration of a user terminal according to an exemplary embodiment of the present invention.

FIG. 6 illustrates a detailed configuration of the user terminal according to an exemplary embodiment of the present invention.

As illustrated in FIG. 6, the user terminal 110 according to an exemplary embodiment of the present invention may include the communication unit 111, an input unit 112, a controller 113, a display unit 114, and a storage unit 115.

The communication unit 111 may interwork with the social media server and the portal service server through wired or wireless communication to transmit/receive various data. For example, the communication unit 111 may transmit a search request message including a keyword and receive a search list.

The input unit 112 may receive information according to a control of a menu or a key by the user. For example, the input unit 112 may receive a keyword for an object in which the user is interested.

When the controller 113 receives the keyword from the user, the controller 113 may generate a search request message including the received keyword and transmit the generated search request message through the communication unit 111.

When the controller 113 receives a search list through the communication unit 111, the controller 113 may extract power users or articles for the received keyword from the received search list.

The display unit 114 may display the extracted power users or articles according to a ranking. For example, the display unit 114 may display all of the power users or articles according to the ranking or display N high rank power users or articles according to the ranking.

Figure 7A:
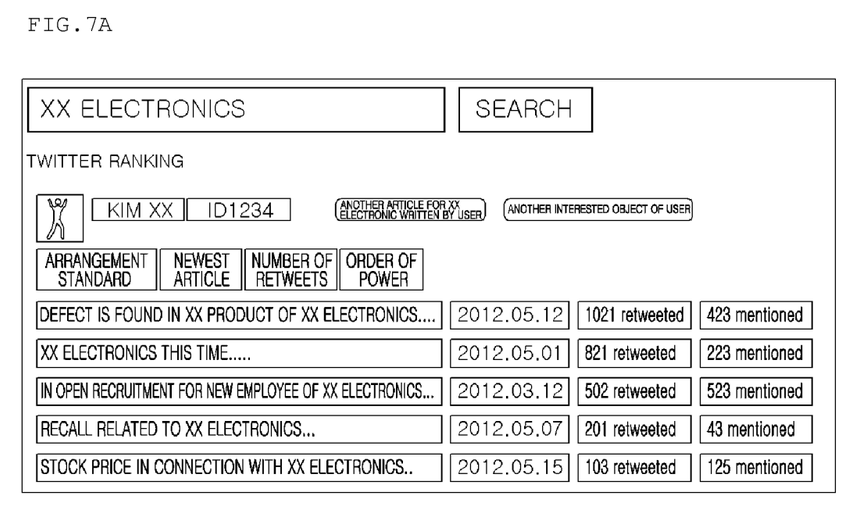
FIGS. 7A and 7B illustrate screens showing a power user ranking for a particular keyword according to an exemplary embodiment of the present invention.
Figure 7B:
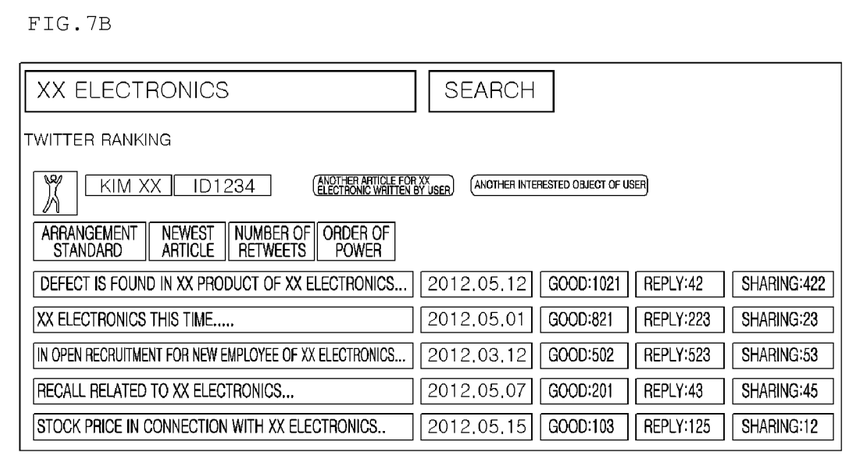

FIGS. 7A and 7B illustrate screens showing a power user ranking for a particular keyword according to an exemplary embodiment of the present invention.

As illustrated in FIGS. 7A and 7B, the user terminal may show power users for the particular keyword, in which the user is interested in, according to a ranking. FIG. 7A shows a Twitter power user ranking, for example, a power ranking, an image input by the user, a user name, a user ID, an article written by the user, and another interested object of the user.

FIG. 7B shows a Facebook power user ranking, for example, a power ranking, a user name, a user ID, an article written by the user, and another interested object of the user.

Figure 8A:
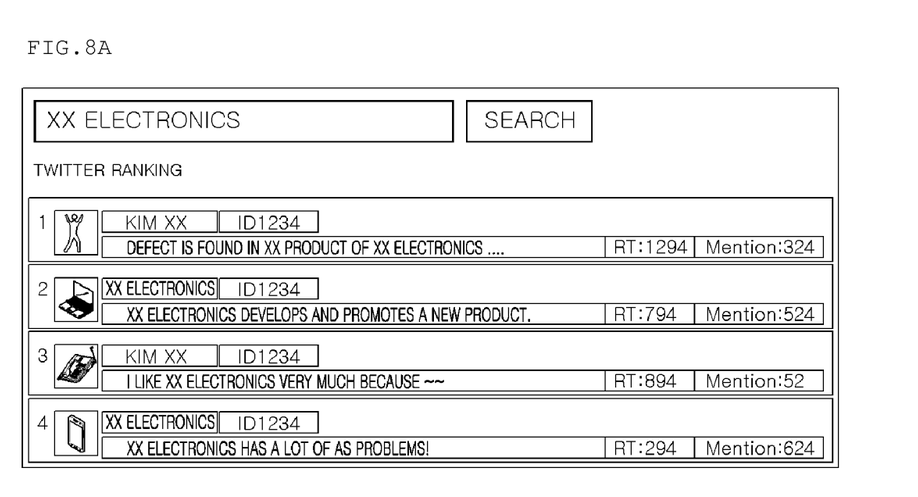
FIGS. 8A and 8B illustrate screens showing an influential article ranking of a particular keyword according to an exemplary embodiment of the present invention.
Figure 8B:
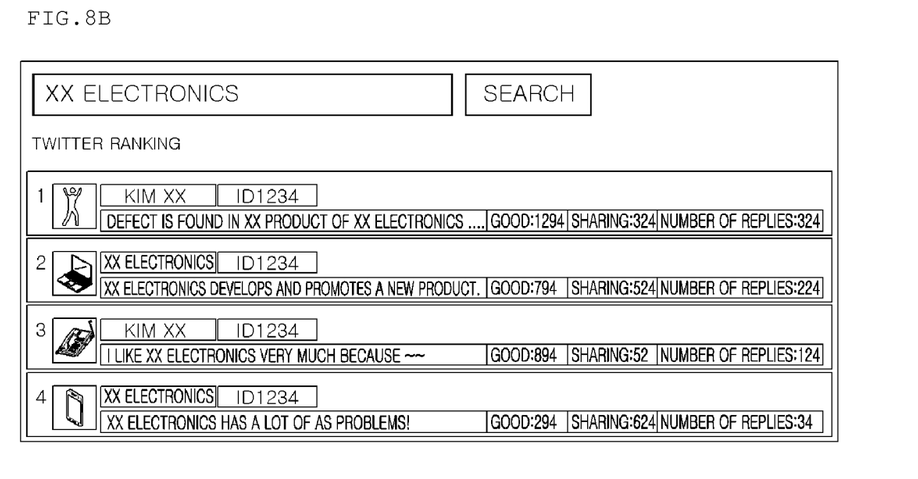

FIGS. 8A and 8B illustrate screens showing a power article ranking for a particular keyword according to an exemplary embodiment of the present invention.

As illustrated in FIGS. 8A and 8B, the user terminal may show a power article for the particular keyword, in which the user is interested. FIG. 8A shows a power article ranking in Twitter, for example, a power ranking, a user name, a user ID, a most powerful article of articles written by the user, the number of rewteets, and the number of replies.

FIG. 8B shows a power article ranking in Facebook, for example, a power ranking, a user name, a user ID, a most powerful article of articles written by the user, the number of users pressing "good", the number of shared users, and the number of replies.

Figure 9A:
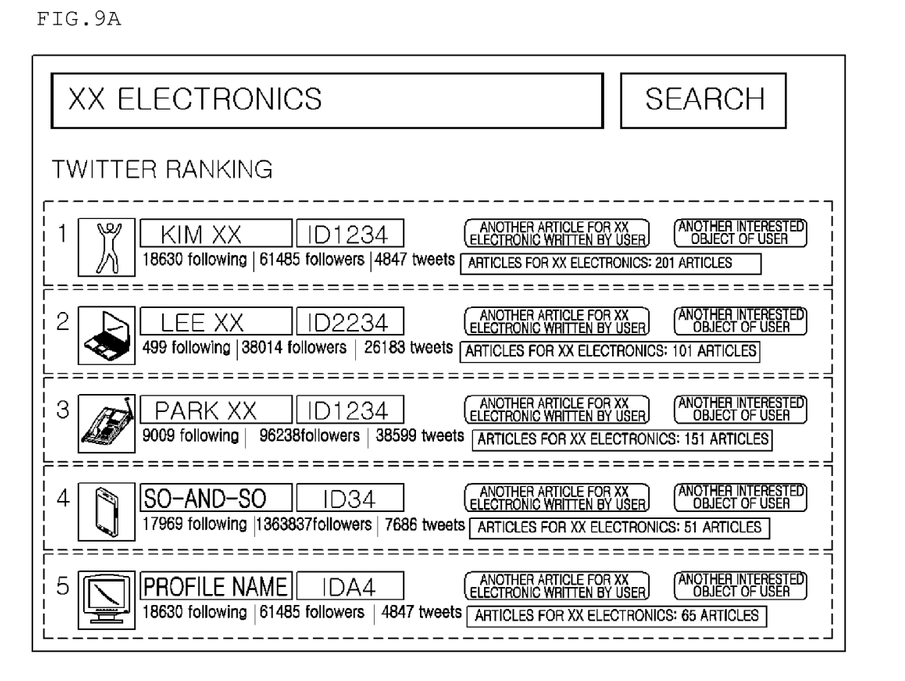
FIGS. 9A and 9B illustrate screens showing a user or an article in a particular ranking according to an exemplary embodiment of the present invention.
Figure 9B:
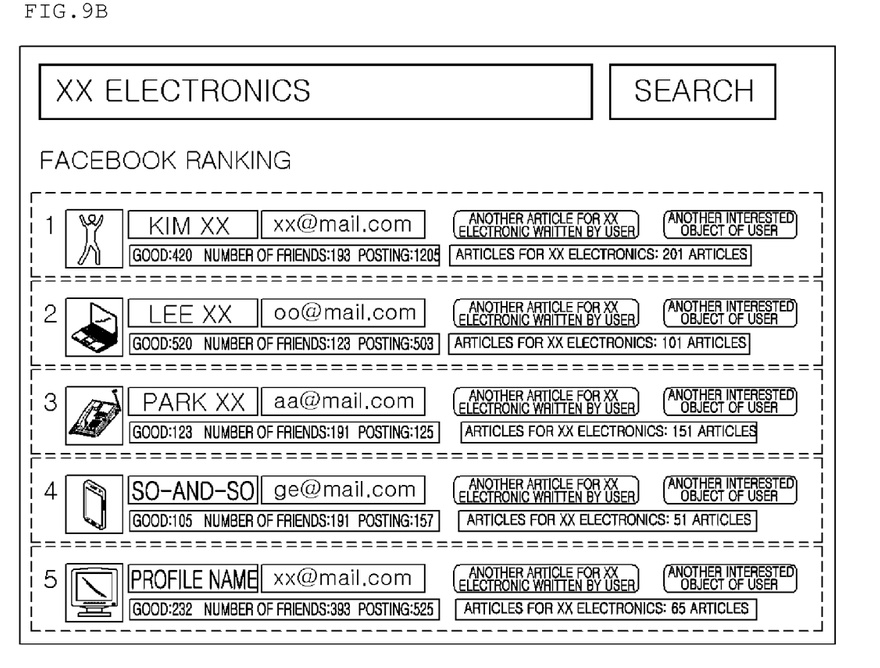

FIGS. 9A and 9B illustrate screens showing a user or an article in a particular ranking according to an exemplary embodiment of the present invention.

As illustrated in FIGS. 9A and 9B, when a user in a particular ranking or an article written by the user is selected within a power user ranking for the particular keyword displayed in FIGS. 7A, 7B, 8A and 8B, articles related to the keyword written by the corresponding user may be shown.

FIG. 9A shows articles related to the keyword written by a user in a particular ranking within a Twitter power user ranking, for example, a Twitter power user having a user name of Kim XX and a user ID of 1234, for example, an article written by the user, a date of the article, the number of retweets, and the number of replies.

FIG. 9B shows articles related to the keyword written by a user in a particular ranking within a Facebook power user ranking, for example, a Twitter power user having a user name of Kim XX and a user ID of 1234, for example, an article written by the user, a date of the article, the number of users pressing "good", the number of replies, and the number of shared users.

At this time, the articles displayed in the user terminal may be arranged according to various conditions, for example, in an order of the newest articles=, the number of retweets, or power and then displayed in the arranged order.

Figure 10:
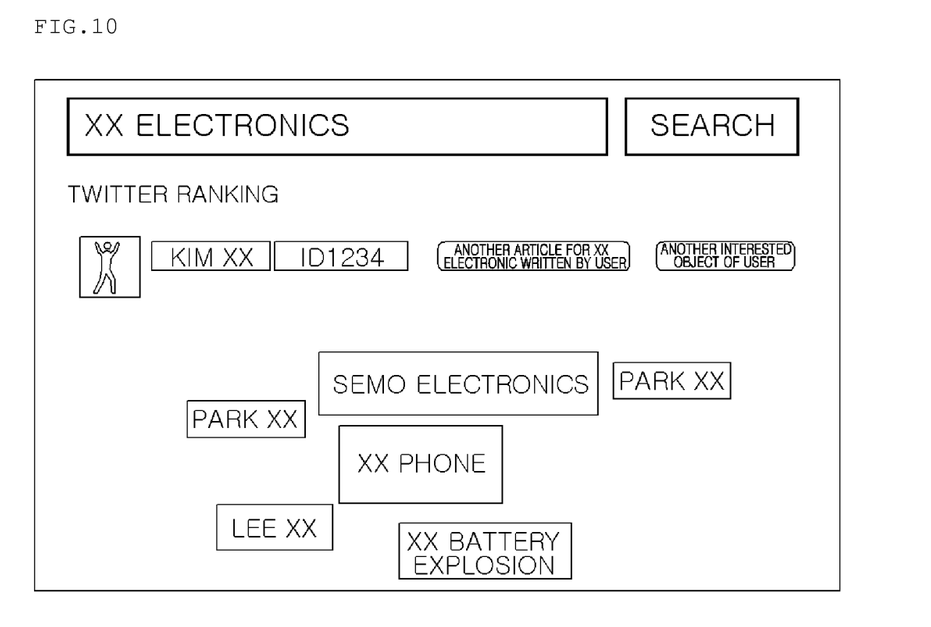
FIG. 10 illustrates a screen showing an interested keyword of a user in Twitter according to an exemplary embodiment of the present invention.

FIG. 10 illustrates a screen showing an interested keyword of the user in Twitter according to an exemplary embodiment of the present invention.

As illustrated in FIG. 10, when another interested object of the user in a particular ranking within a power user ranking for the particular keyword displayed in FIGS. 7A and 7B is selected, another interested object, in which the user is interested, may be shown. Here, another interested object, in which the user is interested, is shown as well as an interested object of "XX Electronics" of a user in a particular ranking of Twitter, for example, a Twitter power user having a user name of Kim XX and a user ID of 1234.

Meanwhile, the embodiments according to the present invention may be implemented in the form of program instructions that can be executed by computers, and may be recorded in computer readable media. The computer readable media may include program instructions, a data file, a data structure, or a combination thereof. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An apparatus for searching for a power user in social media, the apparatus comprising:
    at least one processor which provides:
        an input unit configured to receive a keyword from a user;
        a communication unit configured to transmit a search request message including the received keyword and receive a search response message corresponding to the transmitted search request message;
        a controller configured to, when receiving the search response message, extract a search list in which a plurality of power users related to the keyword are arranged according to a preset power ranking from the received search response message;
        a display unit configured to sequentially display information regarding at least one of the plurality of power users, the displayed information including an image selected by the user related to the respective at least one of the power users, the power users related to the keyword received from the user according to the preset power ranking based on the extracted search list; and
        a storage unit configured to store the extracted search list,
    wherein the controller comprises a word weight engine configured to determine a plurality of words from the keyword and to determine an important word of the plurality of determined words based on respective frequencies of each of the plurality of determined words in the social media,
    wherein the display unit sequentially displays the power users related to the keyword according to the preset power ranking by a value of one or more preset evaluation parameters,
    wherein the preset evaluation parameters include at least one among a number of articles related to a keyword among articles written by the user, a number of retweets of a corresponding article related to the keyword among articles written by the user, a number of followers of a user to be ranked, as number of power users related to the keyword among followers, a number of replies of a corresponding article related to the keyword among articles written by the user or a degree of association with the keyword of the replies, a user power ranking analyzed, independently from keyword, using a follower, a followee, a number of tweets, the number of replies, and a following network analysis, a number of "good" with respect to an article related to the keyword among articles written by the user, a number of sharing of a corresponding article related to the keyword among articles written by the user, a number of replies written by a power user with respect to a keyword among replies of a corresponding article related to the keyword among articles written by the user, the user power ranking analyzed, independently from keyword, using a number of friends, a number of written articles, a number of received "good", a number of received replies, and a friend network analysis.

2. The apparatus of claim 1, wherein the communication unit transmits the search request message to a portal service server and receives the search response message in response to the search request message from the portal service server.

3. The apparatus of claim 1, wherein the communication unit transmits the search request message to a social media server and receives the search response message in response to the search request message from the social media server.

4. The apparatus of claim 1, wherein, when receiving the search response message, the controller extracts a search list in which power articles related to the keyword are arranged according to a preset power ranking from the received search response message, and controls such that the power articles related to the keyword received from the user are sequentially displayed in the display unit according to the preset power ranking based on the extracted search list.

5. The apparatus of claim 1, wherein, when a user in a particular ranking or an article written by the user within a power user ranking related to the keyword is selected, the display unit displays one or more articles related to the keyword written by the corresponding user.

6. The apparatus of claim 1, wherein, when another interested object of a user in a particular ranking within a power user ranking related to the keyword is selected, the display unit displays one or more other interested objects in which the corresponding user is interested.

7. The apparatus of claim 1, wherein a plurality of images selected by the user are displayed and a different one of the plurality of images is associated with each of the plurality of displayed power users.

8. The apparatus of claim 1, wherein a plurality of images selected by the user are displayed and a different one of the plurality of images is associated with each of a plurality of displayed articles by a same power user.

9. The apparatus of claim 1, wherein the display unit sequentially displays the power users related to the keyword according to the preset power ranking and displays a corresponding power ranking, identification information on the user, an article written by the user, and a value of one or more preset evaluation parameters for each of the social media used for evaluating the power ranking.

10. A system for searching for a power user in social media, the system comprising:
    at least one processor which provides:
        a communication unit configured to receive a keyword from a user terminal;
        a relevance analysis engine configured to search for social media having high relevance with the keyword;
        a power analysis engine configured to analyze power of a user on a social network based on a search result to rank power users according to a result of the analysis, generate a search list including the ranked power users, and transmit the generated search list to the user terminal; and
        a display unit configured to display information regarding at least one of the ranked power users, the displayed information including an image selected by the user and related to the respective at least one of the power users, wherein the relevance analysis engine comprises a word weight engine configured to determine a plurality of words from the keyword and to determine an important word of the plurality of determined words based on respective frequencies of each of the plurality of determined words in the social media, wherein the power analysis ranks the power users to apply a value of one or more preset evaluation parameters for each of the social media, wherein the preset evaluation parameters include at least one among a number of articles related to a keyword among articles written by the user, a number of retweets of a corresponding article related to the keyword among articles written by the user, a number of followers of a user to be ranked, a number of power users related to the keyword among followers, a number of replies of a corresponding article related to the keyword among articles written by the user or a degree of association with the keyword of the replies, a user power ranking analyzed, independently from a keyword, using a follower, a followee, a number of tweets, the number of replies, and a following network analysis, a number of "good" with respect to an article related to the keyword among articles written the by user, a number of sharing of a corresponding article related to the keyword among articles written by the user, a number of replies written by a power user with respect to a keyword among replies of a corresponding article related to the keyword among articles written by the user, the user power ranking analyzed, independently from the keyword, using a number of friends, a number of written articles, a number of received "good", a number of received replies, and a friend network analysis.

11. The system of claim 10, wherein the power analysis engine analyzes power of articles on the social network based on the search result to rank power articles according to a result of the analysis, generates a search list including the ranked power articles, and transmits the generated search list to the user terminal.

12. The system of claim 10, wherein the relevance analysis engine further comprises:
a query word automatic extension engine configured to suggest one or more words related to the keyword.

13. A method of searching for a power user in social media, the method comprising:
receiving a keyword from a user;
transmitting a search request message including the received keyword and receiving a search response message corresponding to the transmitted search request message;
extracting a search list in which power users related to the keyword are arranged according to a preset power ranking from the received search response message when the search response message is received;
sequentially displaying information regarding at least one of the power users, the displayed information including an image selected by the user related to the respective at least one of the power users, the power users related to the keyword received from the user according to the preset power ranking based on the extracted search list; and
storing the extracted search list,
wherein the extracting comprises determining a plurality of words from the keyword and determining an important word of the plurality of determined words based on respective frequencies of each of the determined plurality of words in the social media, wherein the sequentially displaying of the power users comprises sequentially displaying the power users related to the keyword according to the preset power ranking in which a corresponding power ranking, identification information on the user, an article written by the user, and a value of one or more preset evaluation parameters for each the social media used for evaluating the power ranking displayed, wherein the power analysis ranks the power users to apply a value of one or more preset evaluation parameters for each of the social media, wherein the preset evaluation parameters include at least one among a number of articles related to a keyword among articles written by the user, a number of retweets of a corresponding article related to the keyword among articles written by the user, a number of followers of a user to be ranked, a number of power users related to the keyword among followers, a number of replies of a corresponding article related to the keyword among articles written by the user or a degree of association with the keyword of the replies, a user power ranking analyzed, independently from a keyword, using a follower, a followee, a number of tweets, the number of replies, and a following network analysis, a number of "good" with respect to an article related to the keyword among articles written by the user, a number of sharp of a corresponding article related to the keyword among articles written by the user, a number of replies written by a power user with respect to a keyword among replies of a corresponding article related to the keyword among articles written by the user, the user power ranking analyzed, independently from the keyword, using a number of friends, a number of written articles, a number of received "good", a number of received replies and a friend network analysis.

14. The method of claim 13, wherein the receiving of the keyword comprises transmitting the search request message to a portal service server and receiving the search response message in response to the search request message from the portal service server.

15. The method of claim 13, wherein the receiving of the keyword comprises transmitting the search request message to a social media server and receiving the search response message in response to the search request message from the social media server.

16. The method of claim 13, wherein the extracting of the search list comprises extracting a search list in which power articles related to the keyword are arranged according to a preset power ranking from the received search response message when the search response message is received, and controlling such that the power articles related to the keyword received from the user are sequentially displayed according to the preset power ranking based on the extracted search list.

17. The method of claim 13, wherein the sequentially displaying of the power users comprises, displaying one or more articles related to the keyword written by the corresponding user when a user in a particular ranking or an article written by the user within a power user ranking related to the keyword is selected.

18. The method of claim 13, wherein the sequentially displaying of the power users comprises displaying one or more other interested objects in which the corresponding user is interested when another interested object of a user in a particular ranking within a power user ranking related to the keyword is selected.

* * * * *